(12) United States Patent
Chaudhary et al.

(10) Patent No.: US 12,299,620 B2
(45) Date of Patent: May 13, 2025

(54) METHOD AND SYSTEM FOR ASSESSMENT OF ENVIRONMENTAL AND/OR SOCIAL RISKS

(71) Applicant: AT&T Intellectual Property I, L.P., Atlanta, GA (US)

(72) Inventors: Shazim Chaudhary, Piscataway, NJ (US); Christopher Thomas, Merrick, NY (US); Roque Rios, III, Middletown, NJ (US); Osama Syed, Iselin, NJ (US); Denis Zou, Whippany, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 93 days.

(21) Appl. No.: 17/741,564

(22) Filed: May 11, 2022

(65) Prior Publication Data

US 2023/0368108 A1 Nov. 16, 2023

(51) Int. Cl.
*G06Q 10/0635* (2023.01)
*G06Q 30/0204* (2023.01)
(Continued)

(52) U.S. Cl.
CPC ..... *G06Q 10/0635* (2013.01); *G06Q 30/0205* (2013.01); *G06Q 30/0245* (2013.01); *G06Q 50/01* (2013.01)

(58) Field of Classification Search
CPC ........... G06Q 10/0635; G06Q 30/0205; G06Q 30/0245; G06Q 50/01
See application file for complete search history.

(56) References Cited

U.S. PATENT DOCUMENTS

| 10,445,673 | B1* | 10/2019 | Hofmann | ......... G06Q 10/06315 |
| 2014/0358836 | A1* | 12/2014 | Moore | ................... H04L 67/535 |
| | | | | 706/46 |

(Continued)

FOREIGN PATENT DOCUMENTS

| CN | 101427104 A | * | 5/2009 | ............. G01C 21/00 |
| DE | 112021004364 T5 | * | 6/2023 | ........... G05B 13/028 |

OTHER PUBLICATIONS

H. Yuan et al., "Evaluation of Smart Environmental Protection Systems and Novel UV-Oriented Solution for Integration, Resilience, Inclusiveness and Sustainability," 2020 5th International Conference on Universal Village (UV), Boston, MA, USA, 2020, pp. 1-77, doi: 10.1109/UV50937.2020.9426222 (Year: 2020).*

(Continued)

Primary Examiner — Mehmet Yesildag
Assistant Examiner — Jeremy L Gunn
(74) Attorney, Agent, or Firm — Guntin & Gust, PLC; Kenneth S. Kwan

(57) ABSTRACT

Aspects of the subject disclosure may include, for example, receiving environmental data from a plurality of environmental data sources, identifying environmental risks based on the environmental data, obtaining profile information relating to a user or entity, based on the obtaining the profile information and the identifying the environmental risks, generating a recommendation for one or more locations of possible interest, and causing the recommendation to be presented to the user or entity, thereby providing location-based environmental risk information that is customized on a per user or per entity basis. Other embodiments are disclosed.

20 Claims, 8 Drawing Sheets

(51) Int. Cl.
 G06Q 30/0242 (2023.01)
 G06Q 50/00 (2012.01)

(56) References Cited

U.S. PATENT DOCUMENTS

| | | | | |
|---|---|---|---|---|
| 2017/0083599 A1* | 3/2017 | Bostick | ............... | G06F 16/954 |
| 2017/0169532 A1* | 6/2017 | Appel | ............... | G06Q 50/265 |
| 2017/0352162 A1* | 12/2017 | Ruan | ............... | G06T 7/60 |
| 2019/0080031 A1* | 3/2019 | Herman | ............... | G06Q 40/08 |
| 2019/0130427 A1* | 5/2019 | Sugimoto | ............... | G06F 16/29 |
| 2020/0019897 A1* | 1/2020 | Kurian | ............... | G06Q 30/0205 |
| 2022/0284026 A1* | 9/2022 | Myron | ............... | G06Q 30/0201 |

OTHER PUBLICATIONS

English translation of DE112021004364T5 (Year: 2022).*
English translation of CN101427104A (Year: 2009).*
H. Thies and K. Stanoevska-Slabeva, "Enhancing the Quality of Information in Inter-organizational Environmental Reporting Information Systems," 2013 46th Hawaii International Conference on System Sciences, Wailea, HI, USA, 2013, pp. 3495-3504, doi: 10.1109/HICSS.2013.198. (Year: 2013).*

* cited by examiner

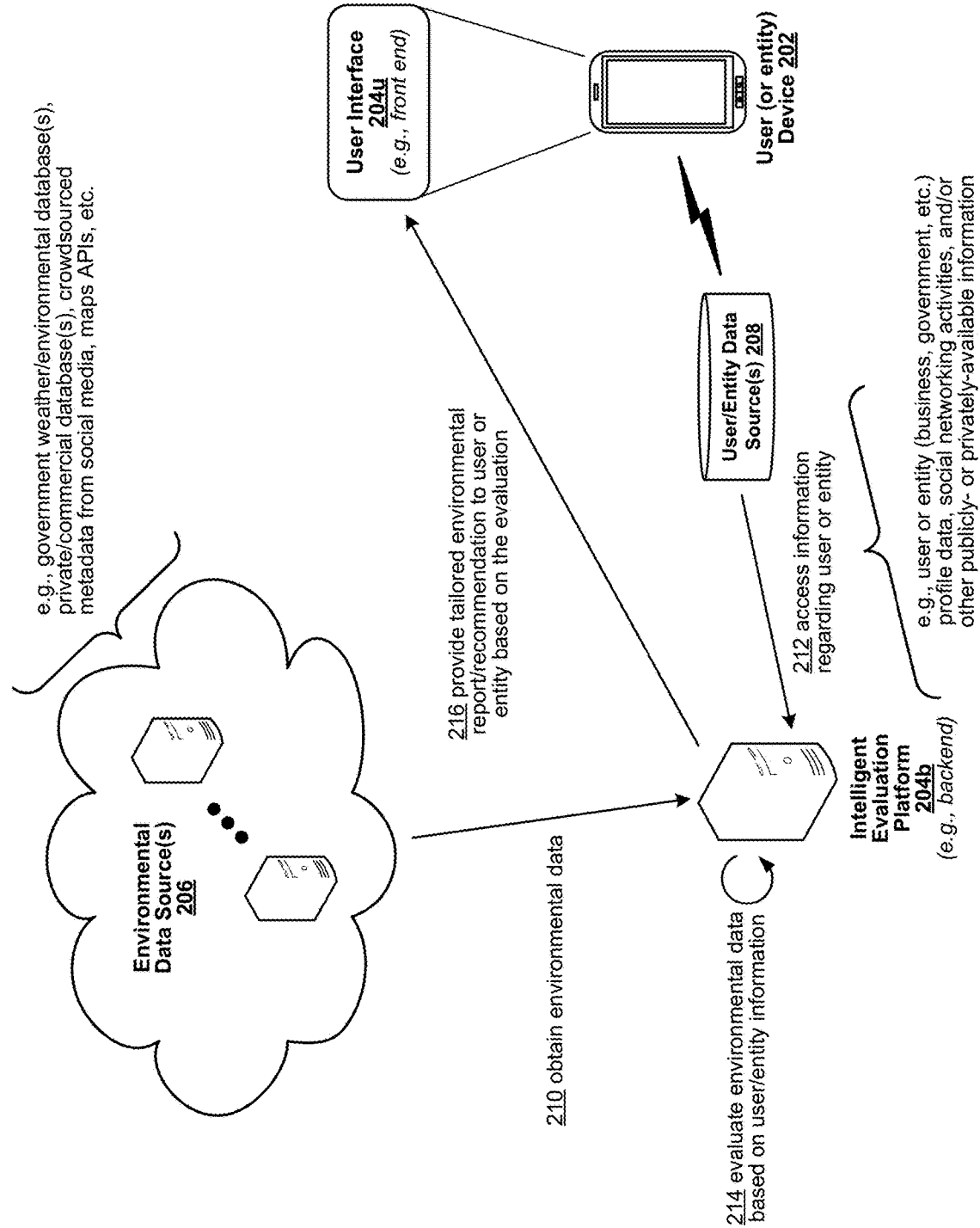

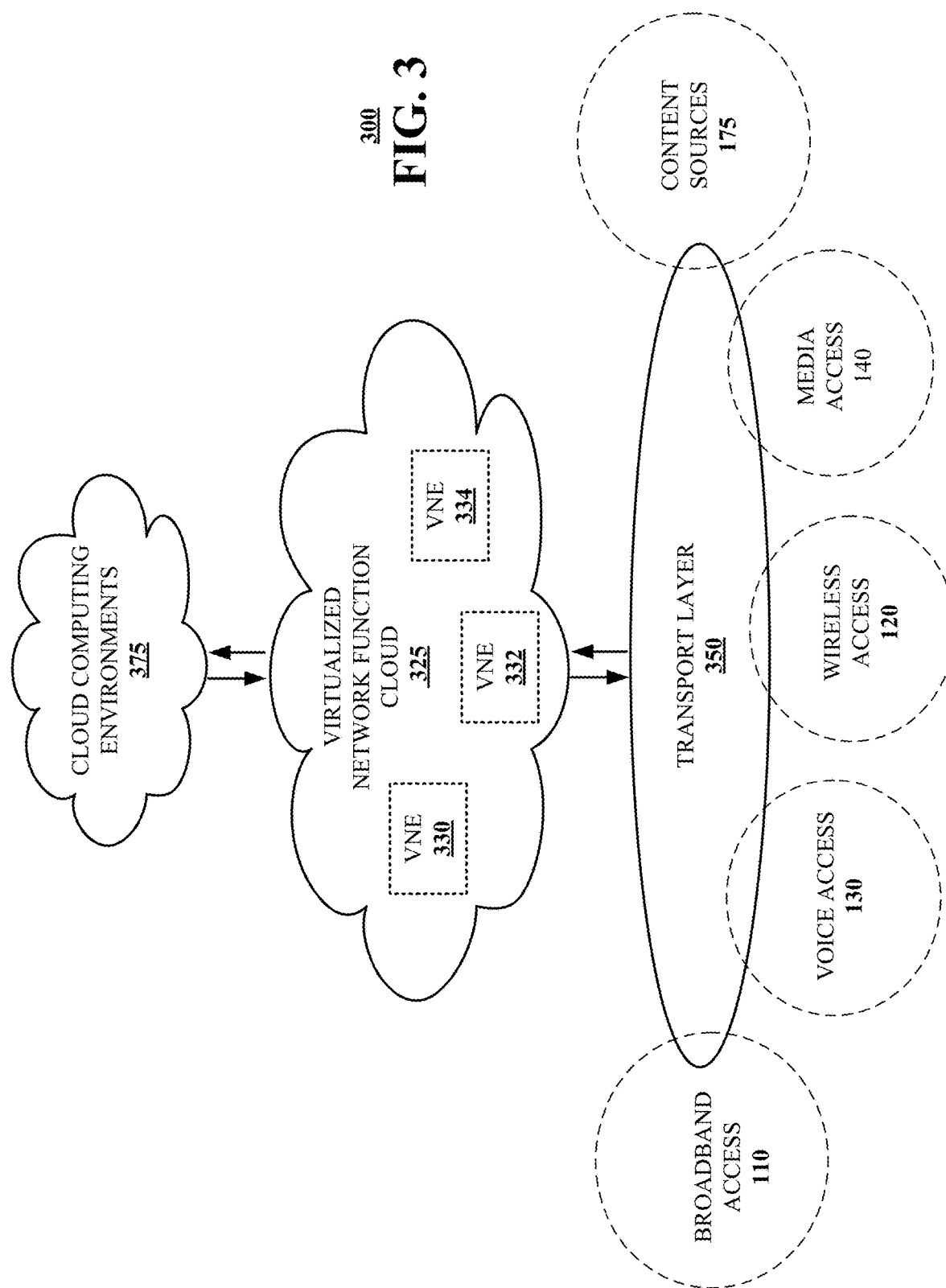

METHOD AND SYSTEM FOR ASSESSMENT OF ENVIRONMENTAL AND/OR SOCIAL RISKS

FIELD OF THE DISCLOSURE

The subject disclosure relates to assessment of environmental and/or social risks.

BACKGROUND

People and businesses may decide to relocate to, or invest in, a geographic area for a variety of reasons. These may include, for instance, improved quality of life, new employment, new opportunities, strategic advantages, and so on.

BRIEF DESCRIPTION OF THE DRAWINGS

Reference will now be made to the accompanying drawings, which are not necessarily drawn to scale, and wherein:

FIG. 2A is a block diagram illustrating an example, non-limiting embodiment of a system functioning within, or operatively overlaid upon, the communications network of FIG. 1 in accordance with various aspects described herein.

FIG. 3 is a block diagram illustrating an example, non-limiting embodiment of a virtualized communications network in accordance with various aspects described herein.

DETAILED DESCRIPTION

Figure 1:
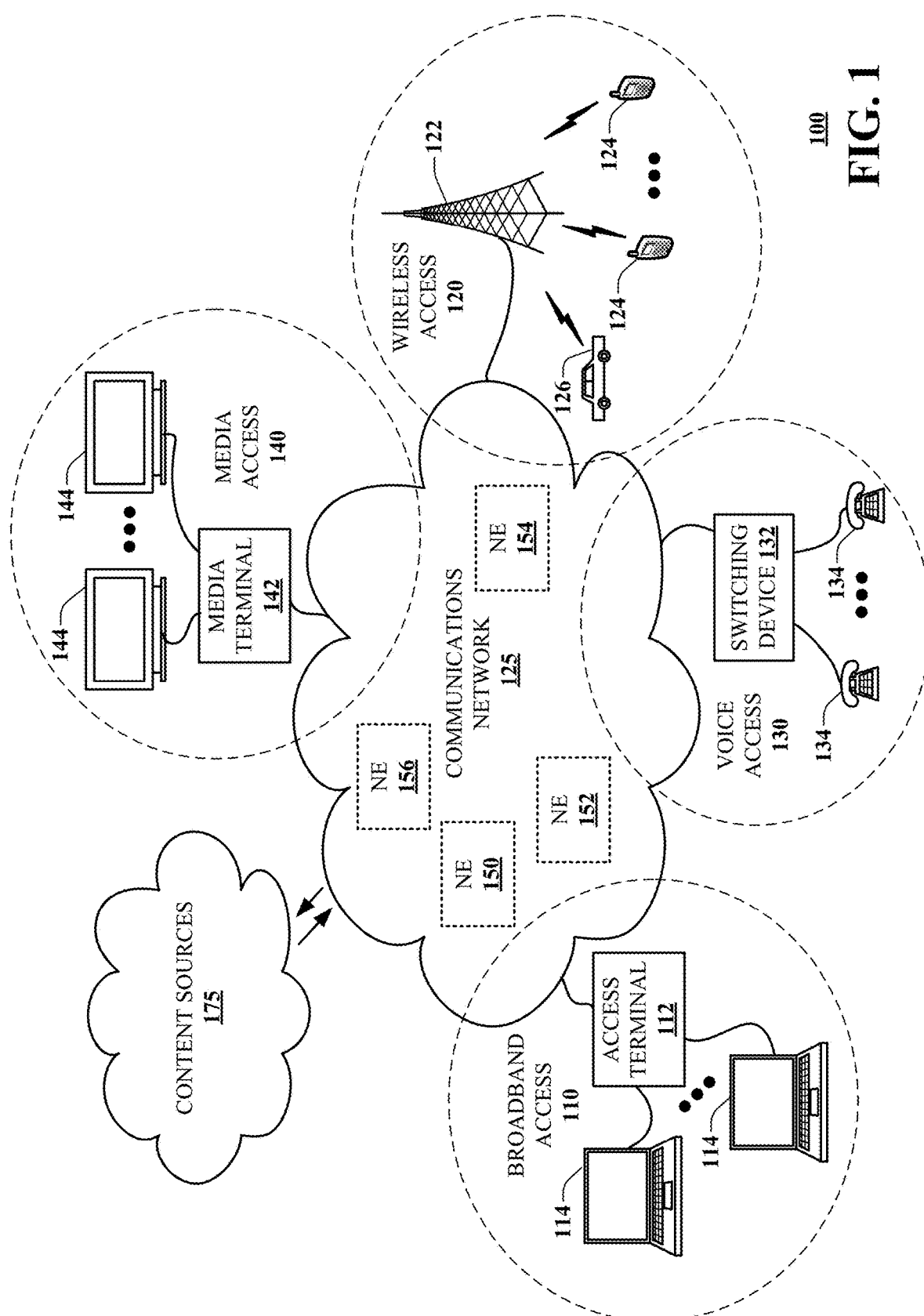
FIG. 1 is a block diagram illustrating an exemplary, non-limiting embodiment of a communications network in accordance with various aspects described herein.

Typically, some research into a location is done before the ultimate decision to relocate or invest is made. However, it is not uncommon for home buyers or companies to settle, or invest, in a location only to later find out about climate change risks or other unforeseen issues in the region. It is thus important for home buyers and businesses to identify and consider environmental change, such as climate change or changes to social factors (e.g., crime and safety, school quality, etc.), before relocating to, or investing in, certain geographic areas of interest. Different regions may be susceptible to different types of climate change, which may have different levels of impact depending on the consumer or business. Questions to consider include likely impact of climate change on consumer residences (e.g., building structures, foundation stability, etc.), maintenance costs of real estate, different types of insurance that might be required for the area's presently known environmental risks, projected popularity of the area based on climate change forecasts, and so on.

Currently, there are public and private sources that provide environmental data for different geographic regions. For instance, AirNow provides risk indicators for air quality by zip code, city, or state. Other sources provide immediate future weather forecasts (e.g., temperature, wind speed, rain levels and probability, etc.), global climate data from satellites (e.g., surface air temperature, carbon dioxide levels, carbon monoxide levels, ozone levels, and water vapor as well as gravity and sea level variations), and even suggestions on low-crime locations with suitable schools for children. However, it is believed that there are presently no sources or systems that provide environmental risk assessments and that tailor relocation/investment recommendations based on user (e.g., personal or business) tolerance, characteristics, behavior, and/or strategic capabilities. For instance, a food and beverage business that relies heavily on a running supply of water, and that has sufficient resources and infrastructure to procure and maintain water storage tanks for sustained operability, might be able and willing to relocate their operations to a drought-susceptible geographic region if such a region offers lower long-term overhead expenses or tax benefits. In contrast, a different business that lacks such resources might not be able or willing to do so. Aside from providing raw data based on zip code or the like, existing sources/systems generally do not evaluate such data on a per-home/user/business level.

The subject disclosure describes, among other things, illustrative embodiments of an intelligent environmental risk evaluation platform (or application) that is capable of providing users or entities with projected environmental change assessments for geographic areas of interest, whether for living purposes, business operations, or general investment. In various embodiments, the intelligent evaluation platform may be configured to obtain or gather environmental data and key metrics from multiple public/enterprise sources (e.g., government agencies or commercial services that provide climate data, statistics on social factors, etc.), and evaluate such data/metrics to identify risks of living and/or conducting business operations in different geographic areas. These sources can provide a variety of data based on location (e.g., zip code, city, state, county, province, town, village, borough, etc.), including, but not limited to, data regarding air quality and/or potentially frequent hazards (e.g., flooding, wildfires, landslides, storms, heavy snow, high humidity, earthquakes, high winds, frost (cold) risk, lightning strikes, wildlife, etc.).

In one or more embodiments, the intelligent evaluation platform may aggregate the environmental data (e.g., using data/statistical analysis techniques), and determine environment-based trends according to location. In certain embodiments, the intelligent evaluation platform may (e.g., continuously or periodically) retrieve new or updated environmental data and update the aggregations and environment-based trend analyses to account for changing climate or social conditions. In some embodiments, the intelligent evaluation platform may provide aggregated environmental data and/or environment-based trend determinations to one or more cloud-based systems for additional processing and/or analysis (e.g., using proprietary processors or techniques).

In various embodiments, the intelligent evaluation platform may be equipped with one or more algorithms configured utilize the environment-based trend determinations to score or grade regions of interest. For instance, a highly desirable place to live with optimal levels of rainfall and no major weather risk may be assigned a grade of "A" on an A-F scale. In one or more embodiments, the intelligent evaluation platform may additionally, or alternatively, determine subcategories of environmental or social factors (e.g., flood, earthquake, tornado frequency, crime rate, etc.) and associated grades to provide more granular information of interest. As described herein, embodiments of the intelligent evaluation platform may access user/entity information (e.g., data regarding preferences, historical behavior, interests, demographics, activities or actions on social media, organizational or business data, and so on), determine user/entity tolerance for certain environmental or social factors (e.g., rain, earthquakes, violence, etc.), and utilize such information to provide personalized location-based recommendations (i.e., on a per user/entity basis). In various embodiments, the intelligent evaluation platform may include a front end, graphical user interface (GUI) or dashboard (e.g., a web and/or mobile application) that is configured to receive location searches or requests, and present environment-based reports/recommendations—e.g., including the aforementioned grading—for specified locations. In this way, the intelligent evaluation platform may consolidate data from existing, but separate, data sources (or databases) of regional (or area) environmental conditions, and present them in a robust, user-friendly GUI for user review and consideration.

Embodiments of the intelligent evaluation platform provide a "one-stop shop" tool for analyzing environmental conditions that might impact potential property investments. Stakeholders that might be affected by environmental change include individuals seeking to purchase real estate, government entities, corporations, and so on. For instance, potential homeowners, real estate investment companies, and real estate developers can leverage the intelligent evaluation platform to determine climate change risks to housing stock of interest. As these stakeholders tend to treat housing stock as appreciating assets, the threat of wildfires, flooding, and other adverse climatological phenomena can pose property risks as well as personal safety risks, and thus the intelligent evaluation platform can offer crucial information for more informed decision-making.

As another example, climate-related reports/recommendations provided by the intelligent evaluation platform can assist government organizations with zoning decisions (such as defining of residential areas and the planning of roads, airspace, and commercial and industrial zoning) and infrastructure choices (relating to water, power, etc.). Military organizations can also leverage such reports/recommendations to identify climate change that can pose national security threats—e.g., resource scarcity may provoke increased competition and conflict between neighboring jurisdictions. As a further example, climatological risk assessment data provided by the intelligent evaluation platform can aid in the identification of problematic areas, particularly near international borders or important resources, such as major rivers or water supplies. Non-governmental organizations (NGOs) and aid organizations can similarly use climatological risk data provided by the intelligent evaluation platform to identify regions that might need future aid. For instance, an aid organization can determine, from crucial information provided by the intelligent evaluation platform, whether a region of a country is subject to mass migration of people due to sudden flooding, and can make early preparations for such an event. As yet another example, corporations can leverage the intelligent evaluation platform to decide on construction and/or maintenance of infrastructure, opening/closing of physical retail locations, and so on. For instance, a telecommunications company can leverage crucial information provided by the intelligent evaluation platform to plan for the construction of cell towers or the like in regions that are less likely to be impacted by climate change, which can provide for more resilient communications networks. The intelligent evaluation platform may be useful in predicting environmental change for a variety of other contexts. For example, the intelligent evaluation platform may be leveraged to identify arid regions that might experience rainfall and later become more fertile and available for farming, identify new areas to cultivate coral or to replenish or replace dying reefs, identify suitable regions to which endangered animals can migrate, and so on. Existing residents or property owners at a location can also leverage the intelligent evaluation platform to determine appliances or equipment that are best suited for the location.

Thus, while environmental change is unavoidable, collating, evaluating, and providing salient data and predictive analyses, as described herein, can enable users and entities that are seeking long-term investments in an area to make more informed decisions. In certain embodiments, the intelligent evaluation platform may provide third-party applications (e.g., from real estate-related companies) with access to the aforementioned environmental risk assessments (e.g., via an application programming interface (API) or the like), which can enable users of those third-party applications to have indirect access to pertinent, personalized location-based information.

One or more aspects of the subject disclosure include a device, comprising a processing system including a processor, and a memory that stores executable instructions that, when executed by the processing system, facilitate performance of operations. The operations can include obtaining environmental data from a plurality of environmental data sources. Further, the operations can include receiving, via a user interface (UI), a request that specifies a location, wherein the environmental data includes data associated with the location. Further, the operations can include accessing profile information relating to a user or entity. Further, the operations can include, based on the request, evaluating the environmental data in accordance with the profile information relating to the user or entity. Further, the operations can include generating a report or recommendation for the location based on the evaluating. Further, the operations can include causing the UI to output the report or recommendation, thereby providing environmental-based information for the location that is personalized to the user or entity.

One or more aspects of the subject disclosure include a non-transitory machine-readable medium, comprising executable instructions that, when executed by a processing system including a processor, facilitate performance of operations. The operations can include receiving environmental data from a plurality of environmental data sources. Further, the operations can include identifying environmental risks based on the environmental data. Further, the operations can include obtaining profile information relating to a user or entity. Further, the operations can include, based on the obtaining the profile information and the identifying the environmental risks, generating a recommendation for one or more locations of possible interest. Further, the operations can include causing the recommendation to be presented to the user or entity, thereby providing location-based environmental risk information that is customized on a per user or per entity basis.

One or more aspects of the subject disclosure include a method. The method can comprise receiving, from a user interface (UI) executing on a computing device having a processing system comprising a processor, a user request for environmental-based information that is personalized to a user, wherein the user request identifies a particular location. Further, the method can include, responsive to the receiving the user request, communicating, by the processing system, with an intelligent environment risk assessment backend for the environmental-based information, wherein the intelligent environment risk assessment backend is configured to obtain environmental data from a plurality of environmental data sources, access user profile information, perform an evaluation of the environmental data in accordance with the user profile information, and generate, based on the evaluation, a report or recommendation with the environmental-based information. Further, the method can include obtaining, by the processing system, the report or recommendation from the intelligent environment risk assessment backend. Further, the method can include presenting, by the processing system, the report or recommendation via the UI.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, evaluation of environmental or climatological phenomena or conditions in light of user or entity profile data, and generation of personalized location-based recommendations based on the evaluation (e.g., as described herein with respect to one or more of FIGS. 2A, 2B, and 2C). In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment of a system 200 functioning within, or overlaid upon, the communications network 100 of FIG. 1 in accordance with various aspects described herein.

As shown in FIG. 2A, the system 200 can include one or more user devices 202, an intelligent evaluation platform 204b, environmental data source(s) 206, and user/entity data source(s) 208. A user device 202 can include, for example, a communication and/or computing device, such as a mobile phone (e.g., a smart phone, a radiotelephone, etc.), a desktop computer, a laptop computer, a tablet computer, a handheld computer, a display device, a gaming device, a wearable communication device (e.g., a smart wristwatch, a pair of smart eyeglasses, media-related gear (e.g., a pair of augmented reality (AR), virtual reality (VR), mixed reality (MR) glasses, a headset, headphones, and/or the like), etc.), a similar type of device, or a combination of some or all of these devices. As depicted in FIG. 2A, a user device 202 may be equipped with a user interface 204u. In exemplary embodiments, the user interface 204u may be a front end system that is associated with the intelligent (e.g., backend) evaluation platform 204b. In various embodiments, and as described in more detail below, the intelligent evaluation platform 204b may be configured to aggregate and analyze environmental data in light of user/entity information, and provide tailored reports/recommendations based on the analysis.

In exemplary embodiments, the environmental data source(s) 206 may include one or more server devices and/or one or more data stores that provide/store various environmental data for different geographic regions. In various embodiments, the environmental data source(s) 206 may include public and/or private sources (e.g., government sources, commercial sources, etc.) of such environmental data. Environmental data may include data relating to climate, weather, and/or social factors, such as temperature, wind, rain, snow, humidity, flooding, wildfires, landslides, storms, earthquakes, frost (cold) risk, heat risk, lightning strikes, wildlife, carbon dioxide levels, carbon monoxide levels, ozone levels, crime and safety, school quality, etc.

In exemplary embodiments, the user/entity data source(s) 208 may include one or more server devices and/or one or more data stores that provide/store various information or profiles associated with users and/or entities. Such information may include, for example, data relating to user preferences (e.g., opt-in or opt-out preferences, entertainment preferences, food preferences, sports-related preferences, other lifestyle preferences, advertisement restrictions, and so on), data relating to user behaviors and/or interests (e.g., historical behaviors, such as Internet browsing activities, content consumption (e.g., videos, games, etc.), purchase histories, and/or the like), demographic data or other data associated with the user (e.g., age of the user, gender of the user, education level, work experience, etc.), and/or the like. In some embodiments, the information can additionally, or alternatively, include data relating to prior locations of the user (e.g., places that the user has visited, performances/shows/conferences that the user has attended, etc.), which may, for example, be determined based on historical location (e.g., global positioning system (GPS)) data, based on Exif (Exchangeable image file) data from photos previously captured by a camera of the user's smartphone, based on historical calendar data, etc. In certain embodiments, the information can additionally, or alternatively, include data relating to prior conversations, discussions, and/or engagements of the user, data relating to advertisement responses of the user (e.g., advertisement exposures, click-through actions, affinities between users and advertisements and/or advertisement types), and/or other data representative or indicative of user activities, preferences, and/or behaviors (e.g., Interactive Advertising Bureau (IAB)-related data, tag data, genre data, embedding data, and/or the like). In some embodiments, the information may include social profile data associated with the user (e.g., the user's social media/networking profile), which may identify actions, preferences, activities, and/or the like relating to the user's friends, family, or other connections, such as other users that the user may be following, etc. In one or more embodiments, the information may include organizational or business data, such as the nature of the organization or business, organizational or business requirements, organizational or business operational conditions/needs, historical sales and/or sales projections, clients/customers of the organization or business, goals/milestones of the organization or business, budgets/historical spending of the organization or business, and so on. Any of the aforementioned types of information may pertain to an individual user, to multiple users, or to an entity (e.g., a business or organization).

It will be appreciated and understood that the system 200 can include any number/types of users/entities, user/entity devices, platforms, data sources, and data stores, and thus the users/entities, user/entity devices, platforms, data sources, and data stores shown in FIG. 2A are for illustrative purposes only.

Further, although not shown, some or all of the user device(s) 202, the intelligent evaluation platform 204b, the environmental data source(s) 206, and the user/entity data source(s) 208 may be communicatively coupled to one another over a network. The network may include one or more wired and/or wireless networks. For example, the network may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

As shown by reference number 210 in FIG. 2A, the intelligent evaluation platform 204b may obtain environmental data from the environmental data source(s) 206. The intelligent evaluation platform 204b may obtain the environmental data from one or more of the environmental data source(s) 206 periodically, continuously, based on user command, and/or based on one or more conditions being satisfied (e.g., based upon receiving a notification of new or updated data being available). In exemplary embodiments, (e.g., each of) the environmental data source(s) 206 may provide application programming interfaces (APIs) or other suitable communication mechanisms that the intelligent evaluation platform 204b may utilize to obtain environmental data.

As shown by reference number 212, the intelligent evaluation platform 204b may access user/entity information or profile data from the user/entity data source(s) 208. The intelligent evaluation platform 204b may access the information periodically, continuously, based on user command, and/or based on one or more conditions being satisfied (e.g., based upon receiving a notification of new or updated information being available). In exemplary embodiments, (e.g., each of) the user/entity data source(s) 208 may provide APIs or other suitable communication mechanisms that the intelligent evaluation platform 204b may utilize to obtain user/entity information. Having access to user/entity information enables customization or personalization of location-based recommendations.

As shown by reference number 214, the intelligent evaluation platform 204b may evaluate the environmental data based on the user or entity information. As shown by reference number 216, the intelligent evaluation platform 204b may provide tailored environmental report(s)/recommendation(s) to the user or entity based on the evaluation. In exemplary embodiments, the intelligent evaluation platform 204b may leverage the user/entity information to identify potentially suitable locations for the user or entity to relocate to or otherwise invest in. The intelligent evaluation platform 204b may perform the evaluation and/or provide the tailored report(s)/recommendation(s) based on a user/entity request (e.g., based on the intelligent evaluation platform 204b receiving, via the user interface 204u, a request that identifies a location or geographic region of interest) or independently of such a request (e.g., based on the intelligent evaluation platform 204b determining, from user/entity information (such as, for instance, a social media post by the user or entity), an indication of a desire to relocate to a different area). In various embodiments, the intelligent evaluation platform 204b may perform the evaluation and/or provide the tailored report(s)/recommendation(s) using one or more artificial intelligence (AI) algorithms. In exemplary embodiments, the AI algorithm(s) may analyze (or mine) the user/entity information and the environmental data, and perform comparisons of some or all of the information with some or all of the environmental data to facilitate generation of the report(s)/recommendation(s). In certain embodiments, one or more classifiers may be utilized to perform identification and analysis of the user/entity information and/or the environmental data.

In one or more embodiments, the intelligent evaluation platform 204b may be trained or configured to analyze some or all of the environmental data to determine environmental or social patterns or trends across geographic areas over time. For instance, the intelligent evaluation platform 204b may employ algorithm(s) to determine (e.g., based on historical environmental data, determined trends in climate/social evolution, etc.) whether a certain region will likely experience flooding over the next five years, ten years etc., whether a certain region will likely become an arid land or dryland (with minimal rainfall), whether a certain region is susceptible to migration of wildlife from neighboring regions due to predicted wildfires or melting of ice, whether crime in a certain area will likely rise or stabilize in the next ten years, and so on.

In one or more embodiments, in a case where a user is involved, the intelligent evaluation platform 204b may be trained or configured to identify data regarding the user's personality—such as, for instance, the user's level of adventurousness (e.g., as may be indicated in photos/videos of the user, where photos/videos of the user hiking, bungee jumping, driving in race cars, etc. may be indicative of a high level of adventurousness), data regarding the user's level of fear of certain hazards (e.g., based on the user's social media posts, based on the user's communication messages to contacts, such as friends/family members, etc., where, for example, photos/videos of the user chasing hurricanes or tornadoes may be indicative of an attractiveness towards, or a low level of a fear of, these phenomena), and so on. In various embodiments, in a different case where an entity, such as a business is involved, the intelligent evaluation platform 204b may be trained or configured to identify the types of activities or operations that are involved in the business, the infrastructure, equipment, and/or other resources that the business may need, and so on. For instance, the intelligent evaluation platform 204b may identify these items based on information regarding the type or industry sector of the business (e.g., oil and gas, software applications, metal production, etc.), based on annual reports provided by the business, etc. In certain embodiments, the intelligent evaluation platform 204b may be trained or configured to additionally, or alternatively, determine location history of the user/entity (e.g., where the user has previously resided or worked, where the business has conducted its operations, etc.) and/or other activities of the user/entity (e.g., the business's participation in conferences, the user's social media interactions (e.g., "likes," emoticon responses to certain news pieces, etc.)).

In various embodiments, the intelligent evaluation platform 204b may be trained or configured to perform any desirable comparison of the user/entity information and the environmental data, where different items of the information and data may be factored in and different weights may be assigned thereto in any suitable way, to derive report(s)/recommendation(s) for the user/entity. In exemplary embodiments, the intelligent evaluation platform 204b may be trained or configured to determine a users'/entity's tolerance of a given environmental condition or social factor, and utilize that tolerance value as part of determining grades or scores for different geographic locations. As one example, the intelligent evaluation platform 204b may be trained or configured to consider the period of time that a user/entity has remained (e.g., resided or conducted operations) in a location at which instances of a particular hazard (such as a flooding or earthquakes) have occurred, and utilize that length of time to identify the user's/entity's tolerance for that hazard. Here, for instance, the intelligent evaluation platform 204b may assign a higher tolerance value for a period of time that is longer and a lower tolerance value for a period of time that is shorter. Continuing the example, the intelligent evaluation platform 204b may then utilize the tolerance value in deciding whether to recommend (and how to grade or score) a different, candidate location for the user/entity that is determined/predicted to be subjected to the same or a similar hazard. Further continuing the example, the intelligent evaluation platform 204b may consider additional information, such as whether the user/entity had previously relocated to a region with the same/similar hazard, and utilize that information to (e.g., further) determine the user's/entity's tolerance value for that hazard. For instance, the tolerance value may be higher in a case where the user/entity had previously relocated to a region associated with the same/similar hazard (e.g., suggesting that the user/entity is tolerant of the hazard) and lower in a case where the user/entity had previously relocated to a region that is not associated with (or that has a lower occurrence rate of) the same/similar hazard.

As another example, the intelligent evaluation platform 204b may determine that a business involved in the production of semiconductor products may have a low tolerance for earthquakes (e.g., due to precision requirements in the manufacture of such products), and thus may determine a lower tolerance value for earthquakes and assign a lower grade to (or perhaps not recommend) a region predicted to experience earthquakes. As a further example, the intelligent evaluation platform 204b may determine that a company engaged in the business of operating windmills may actually desire to expand operations into geographic areas with levels of wind that are predicted to be stable or increase over time, and thus may determine a higher tolerance value for wind and assign a higher grade to a region predicted to experience high wind conditions.

In various embodiments, the intelligent evaluation platform 204b may assign different weights to different preferences/behaviors of a user (e.g., a higher weight for locations based on the user's propensity to dine at locations serving certain preferred cuisines, a lower weight for locations based on the user's dislike of high-rise buildings, etc.), and utilize these weights in combination with the user's determined tolerances for certain hazards (e.g., fear of wildfires based on the user's social media posts, love for hurricane chasing based on the user's photo gallery, etc.) to grade/recommend locations for possible relocation or investment.

In this way, the intelligent evaluation platform 204b may "combine" (e.g., passively and/or actively) gathered information regarding a user/entity with determined environmental trends and/or risks of candidate location(s) of possible interest to derive report(s)/recommendation(s) for the user/entity in a seamless manner.

It is to be appreciated and understood that the intelligent evaluation platform 204b may, for a given user or entity, additionally, or alternatively, take into account information pertaining to other users/entities as part of generating the report(s)/recommendation(s). In various embodiments, the intelligent evaluation platform 204b may identify other similar users/entities (e.g., based on the same or similar demographics, the same or similar education level, the same or similar interests/hobbies, the same or similar tastes in music or fashion, the same or similar industry sector, the same or similar market capitalization, and so on), and utilize information regarding these other users/entities as part of the aforementioned comparisons with the relevant environmental data.

In one or more embodiments, the intelligent evaluation platform 204b may, as part of providing report(s)/recommendation(s), include certain indications that enable a user or entity to distinguish between locations that are determined to be more tolerable for the user or entity from locations that are determined to be less tolerable for the user or entity. The indications may be visual-based, audio-based, and/or haptic-based. As an example, for a given location having environmental conditions or social factors determined to be more tolerable to a user or entity (e.g., where one or more determined tolerance values are equal to or above a threshold value), the intelligent evaluation platform 204b may cause the UI 204u to present a report/recommendation to in a pop-up message or window, whereas, for a different location having environmental conditions or social factors determined to be less tolerable to the user or entity (e.g., where one or more determined tolerance values are less than the threshold value), the intelligent evaluation platform 204b may not cause the UI 204u to present a report/recommendation in such a manner, but may rather simply cause the UI 204u to present the report/recommendation in a native or original window of the UI 204u. Additional visual manipulations may also be made for a report/recommendation presented in a pop-up message or window, such as, for example, lighting up of the message or window, blinking of the message or window, adjustment to a color of the message or window, and/or the like.

In various embodiments, the intelligent evaluation platform 204b may cause the UI 204u to present a map of a given location or geographic region of interest, and may present report(s)/recommendation(s) in conjunction with the map. For example, in a case where the intelligent evaluation platform 204b is to provide report(s)/recommendation(s) for a large geographic region (e.g., that is larger than a threshold area, such as 100 square kilometers, 200 square kilometers, etc.), and where the intelligent evaluation platform 204b determines different grades across different areas of the geographic region (e.g., a grade of 'A' for flooding in a first area of the geographic region and a grade of 'C' for flooding in a second area of the geographic region), the intelligent evaluation platform 204b may cause the UI 204u to present the report(s)/recommendation(s) as an overlay on the map of the geographic region (e.g., with the letter 'A' overlaid on the first area of the geographic region, with the letter 'C' overlaid on the second area of the geographic region, and so on). In certain embodiments, the intelligent evaluation platform 204b may cause the UI 204u to visually highlight or outline the different areas in different manners (e.g., by drawing a thicker or brighter-colored boundary line for a first area associated with a grade of 'A' and by drawing a thinner or darker-colored boundary line for a second area associated with a grade of 'C'). In some embodiments, the intelligent evaluation platform 204b may cause the UI 204u to present an area associated with a higher grade (e.g., equal to or above a threshold grade) in a more prominent manner than an area associated with a lower grade (e.g., less than the threshold grade). For example, the intelligent evaluation platform 204b may cause the UI 204u to blink, light up, brighten and/or periodically change coloring/shading of a boundary line or fill of an area associated with a higher grade, and may not cause the UI 204u to do so for a boundary line or fill of a different area associated with a lower grade. As another example, the intelligent evaluation platform 204b may cause the UI 204u to present a boundary line or fill of an area associated with a higher grade in a visually clear manner (e.g., unblurred), and may cause the UI 204u to blur a boundary line or fill of a different area associated with a lower grade so that it is comparatively less visually clear.

In certain embodiments, the intelligent evaluation platform 204b may search (e.g., the Internet) for available live camera feed(s) from a given location, and cause the UI 204u to present any available feed(s). In some embodiments, the intelligent evaluation platform 204b may, for a given location, conduct such a search and cause the UI 204u to present available feed(s) if (e.g., only if) a determined grade for the location satisfies (e.g., is equal to or greater than) a threshold.

It is to be understood and appreciated that, although FIG. 2A has been described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein.

Figure 2B:
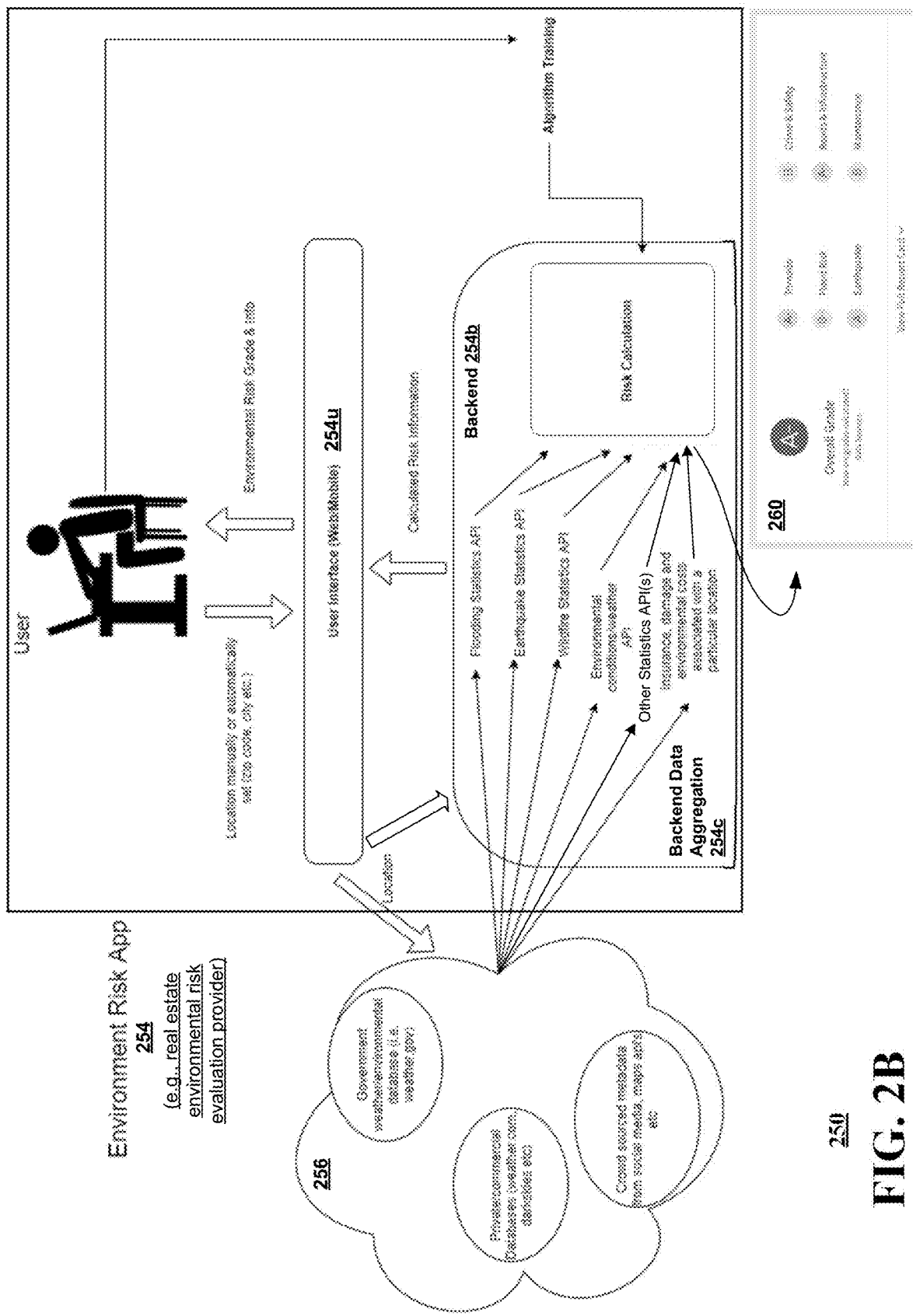
FIG. 2B is a block diagram illustrating an example, non-limiting embodiment of a system functioning in, or in conjunction with, the communications network of FIG. 1 and/or the system of FIG. 2A in accordance with various aspects described herein.

FIG. 2B is a block diagram illustrating an example, non-limiting embodiment of a system 250 functioning in, or in conjunction with, the communications network 100 of FIG. 1 and/or the system 200 of FIG. 2A in accordance with various aspects described herein. The system 250 may be capable of obtaining environmental data from a plethora of (e.g., open source) environmental data providers, and provide assessments as to current/future environmental change risks for different (e.g., user-inputted) locations in the form of a calculated grade or percentage in different environmental categories. In various embodiments, the system 250 may be similar to the system 200 of FIG. 2A. For instance, the system 250 may include an environment risk app or environment 254 that includes a risk analysis and assessment backend platform 254b similar to the intelligent evaluation platform 204b of FIG. 2A, and a UI 254u similar to the UI 204u of FIG. 2A. In certain embodiments, the environmental data source(s) 256 may also be similar to the environmental data source(s) 206 of FIG. 2A.

In various embodiments, the UI 254u may be configured to enable user input of locations of interest, and facilitate evaluation of calculated environmental risks associated with the locations. In one or more embodiments, the UI 254u may be implemented as a web or mobile application. In exemplary embodiments, the backend platform 254b may be configured to obtain, via a backend data aggregation component 254c, environmental data from a variety of environmental data source(s) 256 over respective APIs. The environmental data may be obtained periodically, continuously, based on user command, and/or based on condition(s) being satisfied. The backend data aggregation component 254c may collect and collate data into various environmental categories, such as temperature, humidity, historical landslide statistics, historical flooding statistics, historical earthquake statistics, historical wildfire statistics, historical hurricane/extreme storm statistics, historical crime statistics, etc. Risk calculation may be determined (and updated) based on the inputs for different locations or geographic regions. In one or more embodiments, the backend platform 254b may, for a given location, determine a grade, score, or other value (e.g., in the form of a percentage) for one or more (e.g., each of) the various categories of environmental data, and provide the determinations (e.g., 260) to the UI 254u for presentation to the user. In certain embodiments, descriptions of the categories, the grades/scores, and any metadata (e.g., associated graphs, tables, etc.) may also be provided to the UI 254u for output to the user.

In one or more embodiments, risk calculation may be periodically improved (e.g., on a weekly basis, monthly basis, quarterly basis, annual basis, etc.) via algorithm training based on statistics and/or tracking of the user's actions/activities, such as relocation frequency information for the user after having provided the user with grades/scores for a given location, user feedback on accuracy and cost obtained from publicly available forums (e.g., social media posts) and/or via feedback forms submitted through the UI 254u, and so on. In some embodiments, reinforcement learning algorithms may be employed to improve the risk calculation algorithm. In various embodiments, statistics may relate to environmental cost of living, average rain/snowfall, soil quality, wildfire risk, flood risk, pollen levels, potentially dangerous flora and fauna, and/or other environmental conditions or social factors. In exemplary embodiments, the backend platform 254b may determine grades by weighting statistics by probability and impact, and may consolidate the data into several major categories, such as cost, weather, natural hazards, crime, etc.

In various embodiments, the backend platform 254b may (e.g., similar to the intelligent evaluation platform 204b of FIG. 2A) determine user/entity tolerance for various environmental or climatological phenomena or conditions based on user/entity information (such as that described above with respect to FIG. 2A) and/or user/entity feedback or inputs. In certain embodiments, the backend platform 254b may cause the UI 254u to present determined tolerance levels (e.g., for earthquakes, crime, rain, snow, flooding, and so on) and/or weights (e.g., as to how much earthquakes should be factored into an overall grade, as to how much crime should be factored into an overall grade, as to how much rain should be factored into an overall grade, as to how much snow should be factored into an overall grade, as to how much flooding should be factored into an overall grade, and so on), and may enable user adjustment to one or more (e.g., any) of the tolerance levels and/or weights. For example, the backend platform 254b may cause the UI 254u to present a tolerance level of '5' for earthquakes (e.g., on a scale from '1' to '10') and/or present a weight of '20' for earthquakes (e.g., on a scale from '1' to '100'), and may permit the user to adjust (e.g., via drag and drop or other input/control actions) the tolerance level to '1' or some other value and/or the weight to '50' or some other value. The backend platform 254b may then update any grading/scoring pertaining to earthquakes for location(s) of interest based on the adjusted tolerance level and/or weight. Permitting a user/entity to adjust tolerance or weighting for different environmental or climatological phenomena or conditions enables customization or personalization of reporting/recommendations.

In this way, weights may be determined for (or assigned by the user/entity) to individual conditions based on determined (or set) user/entity tolerances and preferences, and grades/scores may be calculated based on the tolerances/weights, where subcategory grading as well as an overall grade for a given location may be presented in an easily understandable manner.

It is to be understood and appreciated that, although the system 250 may have been described as being distinct from the system 200, some or all of the aspects and/or functionalities of the system 200 may apply to, may be included in, or may be provided by the system 250, and vice versa. For example, some or all of the aspects and/or functionalities of the intelligent evaluation platform 204b, described above with respect to FIG. 2A, may apply to, may be included in, or may be provided by the backend platform 254b, and vice versa, and some or all of the aspects and/or functionalities of the user interface 204u described above with respect to FIG. 2A may apply to, may be included in, or may be provided by the user interface 254u, and vice versa.

It is to be understood and appreciated that the quantity and arrangement of user devices, platforms, sources, interfaces, systems, components, and apps/environments, shown in FIGS. 2A and/or 2B are provided as an example. In practice, there may be additional user devices, platforms, sources, interfaces, systems, components, and apps/environments than those shown in FIGS. 2A and/or 2B. For example, the system 200 and/or the system 250 can include more or fewer user devices, platforms, sources, interfaces, systems, components, and apps/environments, etc. In practice, therefore, there can be hundreds, thousands, millions, billions, etc. of such user devices, platforms, sources, interfaces, systems, components, and apps/environments. In this way, example system 200 and/or system 250 can coordinate, or operate in conjunction with, a set of user devices, platforms, sources, interfaces, systems, components, and apps/environments and/or operate on data sets that cannot be managed manually or objectively by a human actor. Further, as the scale of user/entity information and environmental data may also be immense, the (e.g., constant) aggregating (e.g., collating or feeding from aggregation APIs), analysis, assessment, and/or comparison of such user/entity information and environmental data for risk computation and recommendation also cannot possibly be performed by a human actor or in the mind. Furthermore, two or more user devices, platforms, sources, interfaces, systems, components, or apps/environments shown in FIGS. 2A and/or 2B may be implemented within a single user device, platform, source, interface, system, component, or app/environment, or a single user device, platform, source, interface, system, component, or app/environment shown in FIGS. 2A and/or 2B may be implemented as multiple user devices, platforms, sources, interfaces, systems, components, or apps/environments. Additionally, or alternatively, a set of user devices, platforms, sources, interfaces, systems, components, or apps/environments shown in FIGS. 2A and/or 2B may perform one or more functions described as being performed by another set of user devices, platforms, sources, interfaces, systems, components, or apps/environments shown in FIGS. 2A and/or 2B.

Figure 2C:
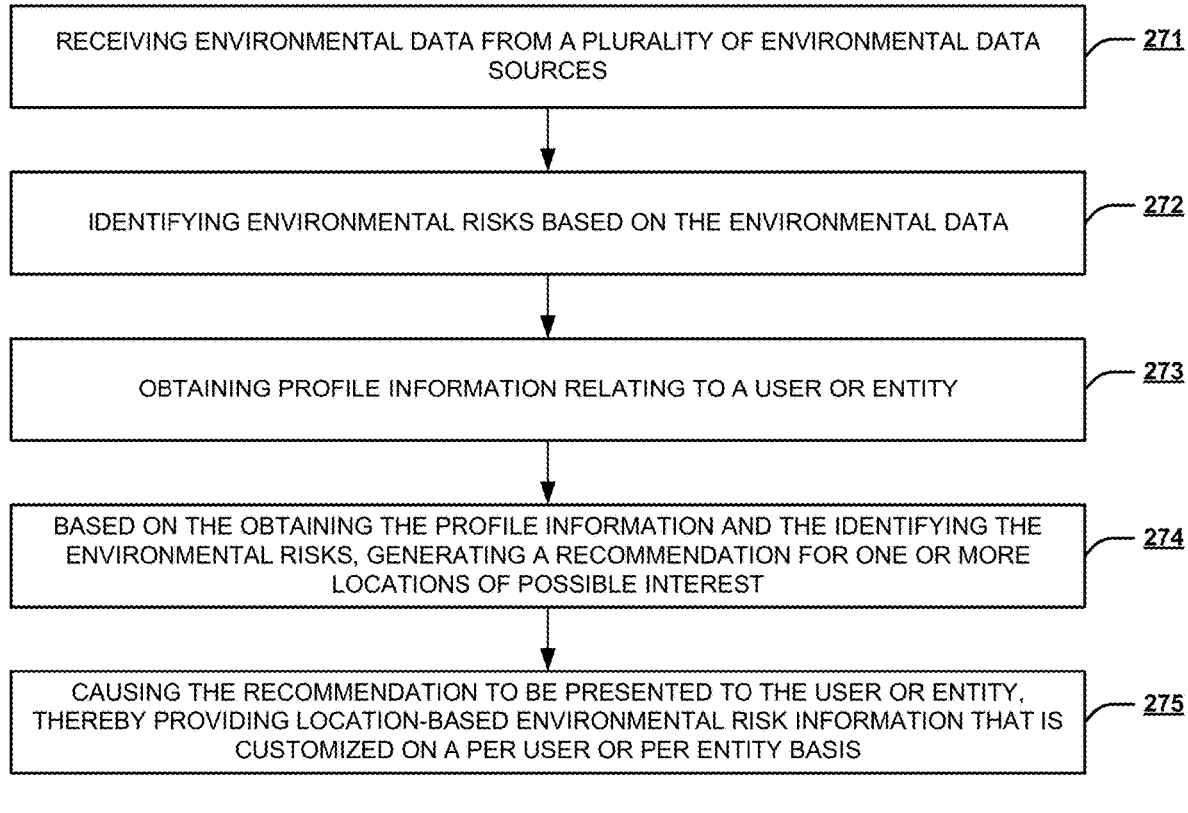
FIG. 2C depicts an illustrative embodiment of a method in accordance with various aspects described herein.

FIG. 2C depicts an illustrative embodiment of a method 270 in accordance with various aspects described herein. In some embodiments, one or more process blocks of FIG. 2C can be performed by an intelligent evaluation platform, such as the backend platform 204b/254b. In some embodiments, one or more process blocks of FIG. 2C may be performed by another device or a group of devices separate from or including the backend platform, such as a user device (e.g., the user device 202), an environmental data source 206/256, and/or a user/entity data source (e.g., the user/entity data source 208).

At 271, the method can include receiving environmental data from a plurality of environmental data sources. For example, the backend platform 204b/254b can, similar to that described above with respect to the system 200 of FIG. 2A and/or system 250 of FIG. 2B, perform one or more operations that include receiving environmental data from a plurality of environmental data sources.

At 272, the method can include identifying environmental risks based on the environmental data. For example, the backend platform 204b/254b can, similar to that described above with respect to the system 200 of FIG. 2A and/or system 250 of FIG. 2B, perform one or more operations that include identifying environmental risks based on the environmental data.

At 273, the method can include obtaining profile information relating to a user or entity. For example, the backend platform 204b/254b can, similar to that described above with respect to the system 200 of FIG. 2A and/or system 250 of FIG. 2B, perform one or more operations that include obtaining profile information relating to a user or entity.

At 274, the method can include, based on the obtaining the profile information and the identifying the environmental risks, generating a recommendation for one or more locations of possible interest. For example, the backend platform 204b/254b can, similar to that described above with respect to the system 200 of FIG. 2A and/or system 250 of FIG. 2B, perform one or more operations that include, based on the obtaining the profile information and the identifying the environmental risks, generating a recommendation for one or more locations of possible interest.

At 275, the method can include causing the recommendation to be presented to the user or entity, thereby providing location-based environmental risk information that is customized on a per user or per entity basis. For example, the backend platform 204b/254b can, similar to that described above with respect to the system 200 of FIG. 2A and/or system 250 of FIG. 2B, perform one or more operations that include causing the recommendation to be presented to the user or entity, thereby providing location-based environmental risk information that is customized on a per user or per entity basis.

In some implementations, the profile information includes information regarding user or entity preferences, information regarding user or entity historical behavior, information regarding user or entity interests, demographic information, information regarding prior locations of the user or entity, information regarding prior user or entity communications, information regarding prior user or entity engagements, information regarding responses to advertisements, information regarding user or entity activities or actions on social media, organizational or business data, or a combination thereof.

In some implementations, the plurality of environmental data sources comprises one or more government data servers or data stores, one or more commercial data servers or data stores, or a combination thereof.

In some implementations, the environmental data includes data corresponding to a plurality of categories of environmental conditions or social factors.

In some implementations, the plurality of categories includes a temperature-related category, a wind-related category, a rainfall-related category, a snowfall-related category, a humidity-related category, a flooding-related category, a wildfire-related category, a landslide-related category, a storm-related category, an earthquake-related category, a frost-related category, a heat-related category, a lightning strike-related category, a wildlife-related category, a carbon dioxide-related category, a carbon monoxide-related category, an ozone-related category, a crime-related category, a school quality-related category, or a combination thereof.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, the subsystems and functions of system 200, system 250, and method 270 presented in FIGS. 1, 2A, 2B, and 2C. For example, virtualized communications network 300 can facilitate, in whole or in part, evaluation of environmental or climatological phenomena or conditions in light of user or entity profile data, and generation of personalized location-based recommendations based on the evaluation (e.g., as described herein with respect to one or more of FIGS. 2A, 2B, and 2C).

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
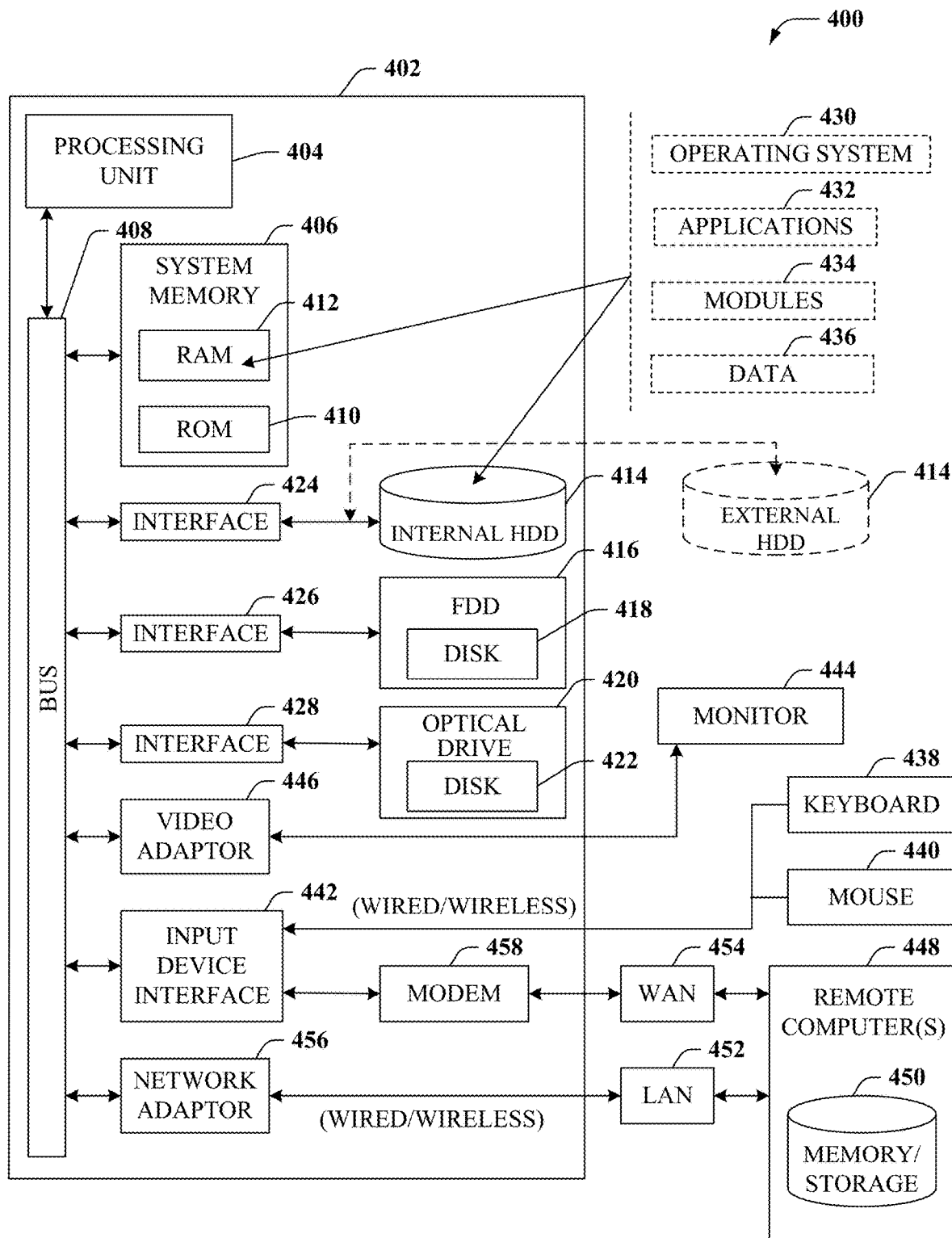
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, evaluation of environmental or climatological phenomena or conditions in light of user or entity profile data, and generation of personalized location-based recommendations based on the evaluation (e.g., as described herein with respect to one or more of FIGS. 2A, 2B, and 2C).

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
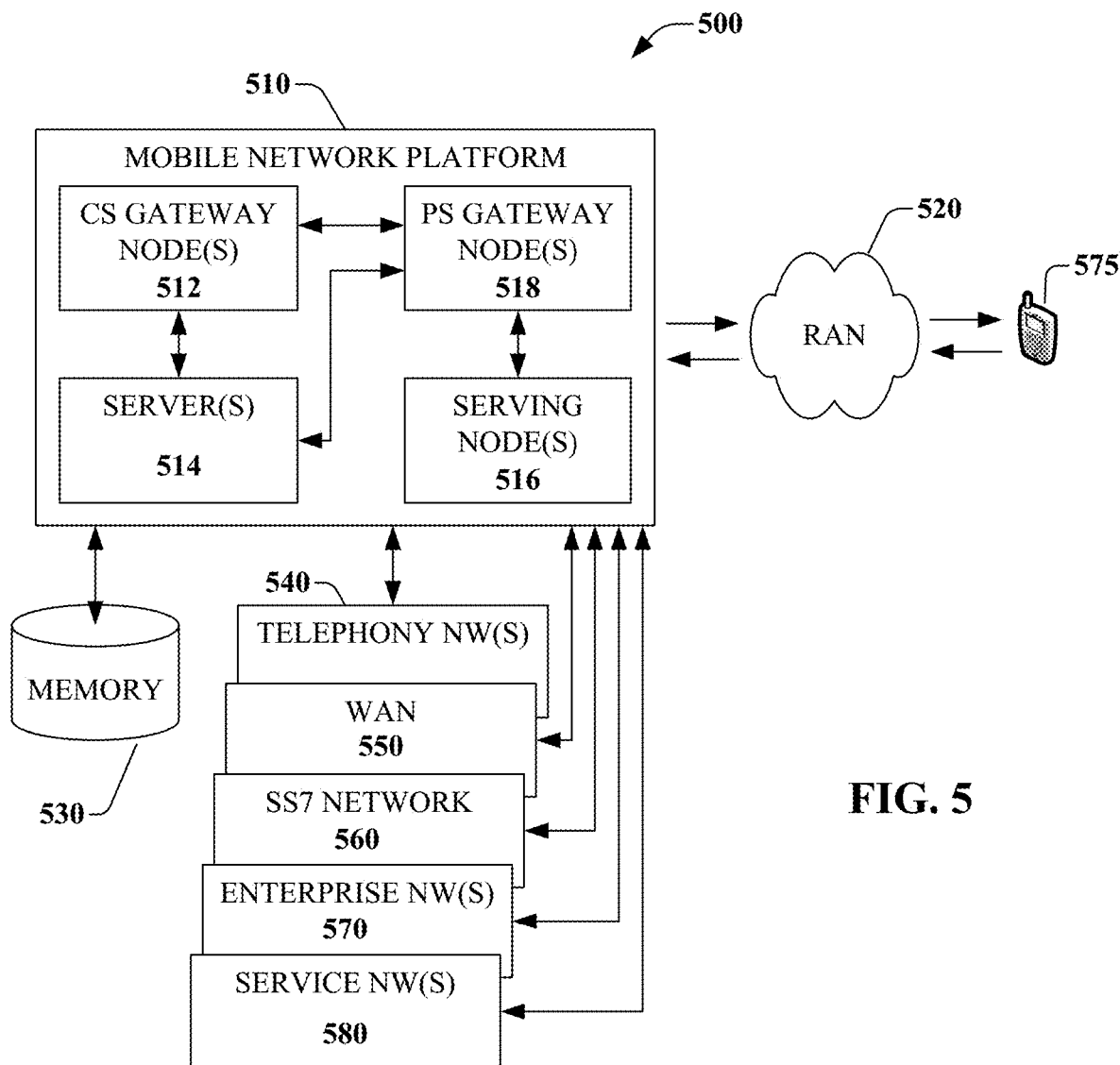
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, evaluation of environmental or climatological phenomena or conditions in light of user or entity profile data, and generation of personalized location-based recommendations based on the evaluation (e.g., as described herein with respect to one or more of FIGS. 2A, 2B, and 2C). In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
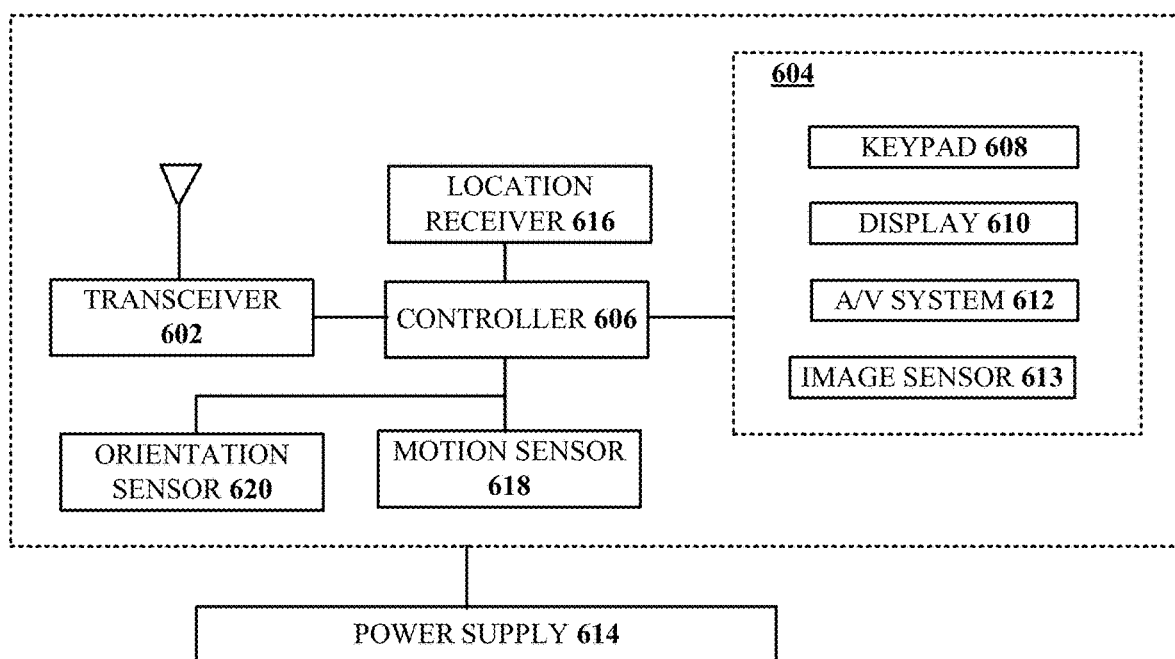
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via communications network 125. For example, computing device 600 can facilitate, in whole or in part, evaluation of environmental or climatological phenomena or conditions in light of user or entity profile data, and generation of personalized location-based recommendations based on the evaluation (e.g., as described herein with respect to one or more of FIGS. 2A, 2B, and 2C).

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence(class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
   obtaining environmental data from a plurality of environmental data sources;
   receiving, via a user interface (UI), a request that specifies a location, wherein the environmental data includes data associated with the location;
   accessing profile information relating to a user or an entity;
   based on the request, evaluating the environmental data in accordance with the profile information relating to the user or the entity;
   generating a report or a recommendation for the location based on the evaluating, wherein the generating involves risk calculations for the location that are performed using a reinforcement learning algorithm, wherein the reinforcement learning algorithm is trained at least in part on a periodic basis based on tracking of actions or activities associated with the user or the entity, and wherein the actions or the activities associated with the user or the entity include user or entity feedback submitted via the UI;
   causing the UI to output the report or the recommendation, thereby providing environmental-based information for the location that is personalized to the user or the entity, wherein the location comprises a geographic region, wherein the report or the recommendation comprises different grades across different areas of the geographic region, including a first grade for a first area of the geographic region and a second grade for a second area of the geographic region that is lower than the first grade, and wherein the causing involves presenting a map that shows the first area and the second area, displaying a first boundary line for the first area and a second boundary line for the second area such that a first manner of presentation of the first boundary line is periodically adjusted while a second manner of presentation of the second boundary line remains unchanged, and applying a first blinking fill in the first area while applying a second fill in the second area that blurs the second area such that the second area is determined to be less visually clear than the first area, so as to visually highlight the first area as having a higher grade than the second area; and
   after the causing the UI to output the report or the recommendation:
   detecting particular user or entity feedback that is submitted via the UI regarding accuracy associated with the report or the recommendation,
   detecting a relocation of the user or the entity from one location at which the user or the entity has resided or conducted operations to a different location,
   causing the reinforcement learning algorithm to be re-trained based on the detecting the particular user or entity feedback and also based on the detecting the relocation of the user or the entity, resulting in a re-trained reinforcement learning algorithm that provides improved risk calculations, relative to the reinforcement learning algorithm, when evaluating candidate locations for the user or the entity with respect to environmental risk, and
   utilizing the re-trained reinforcement learning algorithm to perform one or more risk calculations for the user or the entity in relation to another location responsive to receiving another request to evaluate other environmental data that includes data associated with the another location, thereby facilitating output of another report or another recommendation for the user or the entity.

2. The device of claim 1, wherein the profile information includes information regarding user or entity preferences, information regarding user or entity historical behavior, information regarding user or entity interests, demographic information, information regarding prior locations of the user or the entity, information regarding prior user or entity communications, information regarding prior user or entity engagements, information regarding responses to advertisements, information regarding user or entity activities or actions on social media, organizational or business data, or a combination thereof.

3. The device of claim 1, wherein the plurality of environmental data sources comprises one or more government data servers or data stores, one or more public data servers or data stores, one or more private data servers or data stores, or a combination thereof.

4. The device of claim 1, wherein the environmental data includes data corresponding to a plurality of categories of environmental conditions or social factors.

5. The device of claim 4, wherein the plurality of categories includes a temperature-related category, a wind-related category, a rainfall-related category, a snowfall-related category, a humidity-related category, a flooding-related category, a wildfire-related category, a landslide-related category, a storm-related category, an earthquake-related category, a frost-related category, a heat-related category, a lightning strike-related category, a wildlife-related category, a carbon dioxide-related category, a carbon monoxide-related category, an ozone-related category, a crime-related category, or a combination thereof.

6. The device of claim 4, wherein the operations further comprise determining, for the user or the entity, a respective tolerance value for each category of the plurality of categories of environmental conditions or social factors, resulting in a plurality of respective tolerance values, and wherein the generating the report or the recommendation is in accordance with the plurality of respective tolerance values.

7. The device of claim 4, wherein the report or the recommendation includes a respective grade for each category of the plurality of categories of environmental conditions or social factors and an overall grade for the location.

8. The device of claim 1, wherein the actions or the activities include relocation frequency information for the user or the entity.

9. The device of claim 8, wherein the relocation frequency information for the user or the entity corresponds to a period after a grade or a score for at least one particular location has been provided for the user or the entity.

10. The device of claim 1, wherein the device is implemented in one or more backend servers, and wherein the UI comprises a front end application implemented as a web-based application or a mobile application.

11. A non-transitory machine-readable medium, comprising executable instructions that, when executed by a processing system including a processor, facilitate performance of operations, the operations comprising:
receiving environmental data from a plurality of environmental data sources;
identifying environmental risks based on the environmental data;
obtaining profile information relating to a user or an entity;
based on the obtaining the profile information and the identifying the environmental risks, generating a recommendation for one or more locations of possible interest, where in the generating involves risk calculations for the one or more locations that are performed using a reinforcement learning algorithm, wherein the reinforcement learning algorithm is trained at least in part on a periodic basis based on tracking of actions or activities associated with the user or the entity, and wherein the actions or the activities associated with the user or the entity include user or entity feedback submitted via a user interface (UI);
causing the recommendation to be presented to the user or the entity, thereby providing location-based environmental risk information that is customized on a per user or per entity basis, wherein the recommendation comprises different grades for different locations, including a first grade for a first location and a second grade for a second location that is lower than the first grade, and wherein the causing involves presenting a map that shows the first location and the second location and displaying a first boundary line for the first location and a second boundary line for the second location such that a first manner of presentation of the first boundary line is periodically adjusted while a second manner of presentation of the second boundary line remains unchanged, and applying a first blinking fill within the first boundary line while applying a second fill within the second boundary line that blurs the second location such that the second location is determined to be less visually clear than the first location, so as to visually highlight the first location as having a higher grade than the second location; and
after the causing the recommendation to be presented to the user or the entity:
detecting particular user or entity feedback that is submitted via the UI regarding accuracy associated with the recommendation,
detecting a relocation of the user or the entity from one location at which the user or the entity has resided or conducted operations to a different location,
causing the reinforcement learning algorithm to be re-trained based on the detecting the particular user or entity feedback and also based on the detecting the relocation of the user or the entity, resulting in a re-trained reinforcement learning algorithm that provides improved risk calculations, relative to the reinforcement learning algorithm, when evaluating candidate locations for the user or the entity with respect to environmental risk, and
utilizing the re-trained reinforcement learning algorithm to perform one or more risk calculations for the user or the entity in relation to another location responsive to receiving a request to evaluate other environmental data that includes data associated with the another location, thereby facilitating output of another recommendation for the user or the entity.

12. The non-transitory machine-readable medium of claim 11, wherein the profile information includes information regarding user or entity preferences, information regarding user or entity historical behavior, information regarding user or entity interests, demographic information, information regarding prior locations of the user or entity, information regarding prior user or entity communications, information regarding prior user or entity engagements, information regarding responses to advertisements, information regarding user or entity activities or actions on social media, organizational or business data, or a combination thereof.

13. The non-transitory machine-readable medium of claim 11, wherein the plurality of environmental data sources comprises one or more government data servers or data stores, one or more commercial data servers or data stores, or a combination thereof.

14. The non-transitory machine-readable medium of claim 11, wherein the environmental data includes data corresponding to a plurality of categories of environmental conditions or social factors.

15. The non-transitory machine-readable medium of claim 14, wherein the plurality of categories includes a temperature-related category, a wind-related category, a rainfall-related category, a snowfall-related category, a humidity-related category, a flooding-related category, a wildfire-related category, a landslide-related category, a storm-related category, an earthquake-related category, a frost-related category, a heat-related category, a lightning strike-related category, a wildlife-related category, a carbon dioxide-related category, a carbon monoxide-related category, an ozone-related category, a crime-related category, a school quality-related category, or a combination thereof.

16. A method, comprising:
receiving, by a processing system comprising a processor and from a user interface (UI) executing on a computing device, a user request for environmental-based information that is personalized to a user, wherein the user request identifies a particular location;
responsive to the receiving the user request, obtaining, by the processing system, environmental data from a plurality of environmental data sources, accessing, by the processing system, user profile information, performing, by the processing system, an evaluation of the environmental data in accordance with the user profile information, and generating, by the processing system and based on the evaluation, a report or a recommendation with the environmental-based information, wherein the generating involves risk calculations for the particular location that are performed using a reinforcement learning algorithm, wherein the reinforcement learning algorithm is trained at least in part on a periodic basis based on tracking of actions or activities associated with the user, and wherein the actions or the activities associated with the user include user feedback submitted via the UI;
outputting, by the processing system, the report or the recommendation to the UI for presentation on the computing device, wherein the particular location comprises a geographic region, wherein the report or the recommendation comprises different grades across different areas of the geographic region, including a first grade for a first area of the geographic region and a second grade for a second area of the geographic region that is lower than the first grade, and wherein the presentation involves presenting a map that shows the first area and the second area and displaying a first boundary line for the first area and a second boundary line for the second area such that a first manner of presentation of the first boundary line is periodically adjusted while a second manner of presentation of the second boundary line remains unchanged, and applying a first blinking fill in the first area while applying a second fill in the second area that blurs the second area such that the second area is determined to be less visually clear than the first area, so as to visually highlight the first area as having a higher grade than the second area; and
after the outputting the report or the recommendation to the UI:
detecting, by the processing system, particular user feedback that is submitted via the UI regarding accuracy associated with the report or the recommendation,
detecting, by the processing system, a relocation of the user from one location at which the user has resided or conducted operations to a different location,
causing, by the processing system, the reinforcement learning algorithm to be re-trained based on the detecting the particular user feedback and also based on the detecting the relocation of the user, resulting in a re-trained reinforcement learning algorithm that provides improved risk calculations relative to the reinforcement learning algorithm, when evaluating candidate locations for the user with respect to environmental risk, and
utilizing, by the processing system, the re-trained reinforcement learning algorithm to perform one or more risk calculations for the user in relation to another location responsive to receiving another user request to evaluate other environmental data that includes data associated with the another location, thereby facilitating output of another report or another recommendation for the user.

17. The method of claim 16, wherein the environmental data includes data corresponding to a plurality of categories of environmental conditions or social factors.

18. The method of claim 17, further comprising determining, by the processing system and for the user, a respective tolerance value for each category of the plurality of categories of environmental conditions or social factors, resulting in a plurality of respective tolerance values, wherein the generating comprises generating the report or the recommendation in accordance with the plurality of respective tolerance values.

19. The method of claim 17, wherein the report or the recommendation includes a grade for each category of the plurality of categories of environmental conditions or social factors and an overall grade for the particular location.

20. The method of claim 16, wherein the actions or the activities include relocation frequency information for the user that corresponds to a period after a grade or a score for at least one location has been provided for the user.

* * * * *